March 11, 1969 P. E. STUCKERT 3,432,685

SENSE CIRCUIT FOR BISTABLE MEMORY DEVICES

Filed Sept. 23, 1964 Sheet 1 of 2

INVENTOR
PAUL E. STUCKERT

BY George Baron

ATTORNEY

United States Patent Office
3,432,685
Patented Mar. 11, 1969

3,432,685

SENSE CIRCUIT FOR BISTABLE MEMORY DEVICES

Paul E. Stuckert, Katonah, N.Y., assignor to International Business Machines Corporation, New York, N.Y., a corporation of New York Filed Sept. 23, 1964, Ser. No. 398,511
U.S. Cl. 307—231 5 Claims
Int. Cl. H03k 5/20, 5/00, 17/00

ABSTRACT OF THE DISCLOSURE

The invention relates to a sensing circuit for high speed memories using the principle of pulse position modulation techniques. The circuits used overcome two major difficulties of high speed memories, namely, noise signals that linger from previous "write" operations and the shift in the baseline on which sense signals appear.

This invention relates to sensing circuits in general, but more particularly to circuits for sensing the bistable storage states of memory elements capable of switching at extremely high speeds.

Most sense amplifiers that detect and amplify the output signals produced by a bistable element, such as a magnetic core, transistor circuits, tunnel diode circuits, or similar elements or circuits that produce binary output signals suffer from two major limitations. One limitation arises out of the presence of large noise signals that are induced on the sense lines associated with a bistable element or circuit during the writing of information into such bistable element. These noise signals, in general, persist long enough and are large enough that the sense amplifier cannot recover from them in time to sense the signal appearing on the sense line during the read operation following the write operation. The recovery time due to these large noise pulses slows down the speed at which information can be stored in and fetched from the main memory.

The second major limitation of most sense amplifiers lies in the shift of the "baseline" on which the sense signals appear. Sense amplifiers in general, after they have amplified a signal to a desired level, employ amplitude discrimination in some fashion to determine whether the signal amplified is a "1" or a "0." Since such amplifiers do not generally amplify D.C. components of the input signals, the output of the amplifier inherently produces what is called "baseline shift," a pattern-sensitive effect. That is, the readout of a "1" state of a bistable element results in a certain voltage appearing on the output of the amplifying stages associated with said interrogated element, which voltage is sensed as a "1" output signal; a "0" output signal voltage is either negative or negligibly positive as compared with the positive amplitude obtained during the readout of a "1" stored in the interrogated element. However, due to reflections, long recovery times of semiconductor elements, limitations in the low frequency response of the amplifying stages, etc., the baseline is shifted from its quiescent potential. Should such shift lower the quiescent potential of the baseline, a "1" output voltage may appear to be less than the minimum voltage that the amplitude detector associated with a sense amplifier can recognize as a "1" output signal; should the baseline be raised above the quiescent potential of the baseline, a small positive "0" output signal might appear as a sufficiently high amplitude pulse so that the amplitude detector "recognizes" such "0" output signal as a "1" output signal.

In order to provide sensing means that can operate independently of large noise pulses on the sense line or the "baseline shift" of signals, yet be capable of processing the readout of information from high speed memories, two major features are combined to attain such characteristics, namely, (1) low peak current tunnel diodes combined with a ramped strobing pulse to assure switching of such diodes and (2) employment of sampling techniques to obtain readout signals from switched memory elements independent of baseline shift. The characteristics of tunnel diodes are such as to lend themselves for use in high-frequency circuits as evidenced by such articles in the prior art as "Tunnel Diodes as High-Frequency Devices" by H. S. Sommers, Jr., that appeared in the Proc. of the IRE, July 1959, pp. 1201–1206. Of interest, for the present invention, is that the tunnel diode has an I–V characteristic that displays a negative resistance region between two positive stable resistance regions, permitting bistable operation with sharp switching thresholds, and is also a high-frequency low-power device. The use of sampling techniques permits the sensing of information, as indicated by signal amplitude, to be converted to pulse information wherein the relative positions of pulses, rather than their amplitudes, indicate the information delivered to the sense amplifier.

Consequently, it is an object of this invention to provide a high-speed sensing device.

Another object is to provide a high-speed sensing device whose reliability is increased.

It is yet another object to provide a sense amplifier that is capable of low level signal discrimination and yet have low power requirements.

Still another object is to provide a discriminator circuit compatible with such novel sensing device.

The foregoing and other objects, features and advantages of the invention will be apparent from the following more particular description of preferred embodiments of the invention, as illustrated in the accompanying drawings.

In the drawings:

FIGURE 1*a* is an electrical circuit of an embodiment of the invention as it relates to the sense amplifier aspect of the invention and FIGURE 1*b* is an electrical circuit of an embodiment of a discriminator circuit usable with an amplifier of the type shown in FIGURE 1*a*.

Figure 1A:
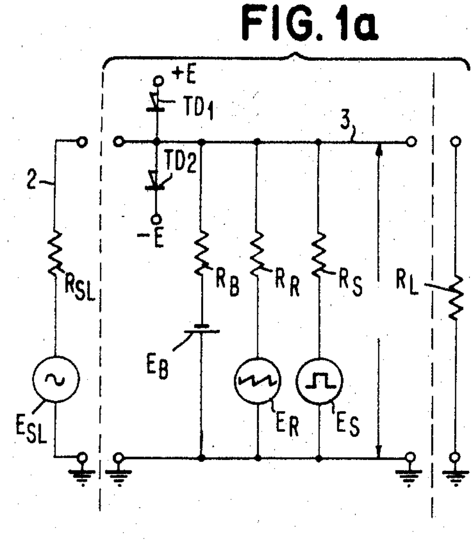

FIGURE 1*a* discloses the main circuit of the novel sense amplifier and includes two tunnel diodes $TD_1$ and $TD_2$ with a positive voltage +E applied to a terminal of $TD_1$ and a negative voltage —E applied to a terminal of $TD_2$. Line 2 carries the output signal of a switched bistable element (not shown) of a memory storage device, such signal producing a voltage drop across resistor $R_{SL}$. It is understood that $E_{SL}$ and $R_{SL}$ can be the equivalent circuit of either the sense line itself that is associated with a memory element, or of the output stage of an amplifier interposed between such sense line 2 and the sensing means shown in FIGURE 1*a* to the right of the dashed line. For the purpose of describing the invention, however, $E_{SL}$ and $R_{SL}$ are the equivalent circuit of the sense line 2. The voltage $E_{SL}$ is shown in series with such sense line 2 to represent a source of noise pulses that may appear on such sense line 2 along with the signal to be sensed by the amplifier. Voltage source $E_B$ and resistor $R_B$ provide a D.C. current source which, under quiescent conditions, biases the tunnel diodes $TD_1$ and $TD_2$ in a manner to be described hereinafter. $E_R$ and $R_R$ provide a current source that emits a saw-tooth wave, such saw-tooth serving to modify the location of the load line of the tunnel diodes $TD_1$ and $TD_2$. Voltage $E_R$ is continuously applied to the sense amplifier circuit. $E_S$ and $R_S$ serve as a strobe or gating current source that shifts the load lines of the tunnel diode circuit during a read operation. A resistor $R_L$ represents the equivalent load presented by the discriminator circuit of FIGURE 1*b*, said discriminator circuit providing a means for distinguishing between the readout of a "1" or a "0."

The operation of the sensing means of FIGURE 1*a* will be described in combination with FIGURES 2 and 3. As seen in FIGURE 3, a read-write cycle is synchronous in operation and the duration T of the read portion of the cycle is the same as the duration of the write portion of the cycle. Sense line signals appearing on line 2 appear as a positive pulse *p* when a "1" is being read out of a switched bistable memory element, or as a negative pulse *p'*, or a negligibly small positive voltage pulse, when a "0" is read out of the switched bistbale element. Occurring on the sense line 2 are noise pulses represented figuratively by block 6 wherein such noise pulses are considerably larger in amplitude than the sensing pulses *p* or *p'*. However, to avoid spurious or undesired switching of diodes $TD_1$ and $TD_2$ due to noise pulses 6, the design of the amplifier circuit is such that current delivered on line 3 (see FIGURE 1*a*) by noise signals must not exceed the current available by the strobing pulse source $E_S$ operating through resistor $R_S$.

It should be noted that the frequency of saw-tooth waves 5 generated by generator source $E_R$ is a fixed multiple of the memory operating frequency. In the instant case, the saw-tooth generator produces four cycles for every one read or write cycle. The rectangular signal strobe pulse 8 is present only during the read portion of the memory cycle and is turned on at the beginning of the cycle, represented by the time $T_0$ and ends at the time $T_R$. The voltage $E_L$ shows the output pulses 10 and 12 that appear across the resistor $R_L$ as a result of the switching of tunnel diodes $TD_1$ and $TD_2$. Operation of the sense amplifier acts in the following manner.

Figure 2:
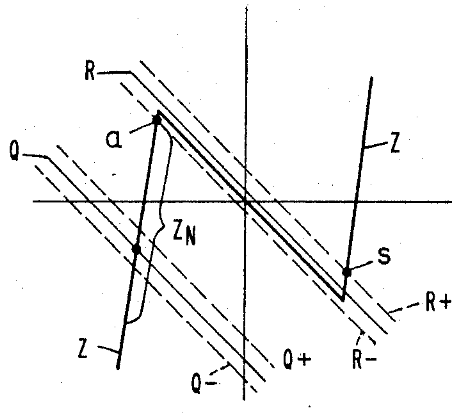
FIGURE 2 is a voltage-current diagram to aid in explaining the operation of the tunnel diodes in the circuit of FIGURE 1*a*.
Figure 3:
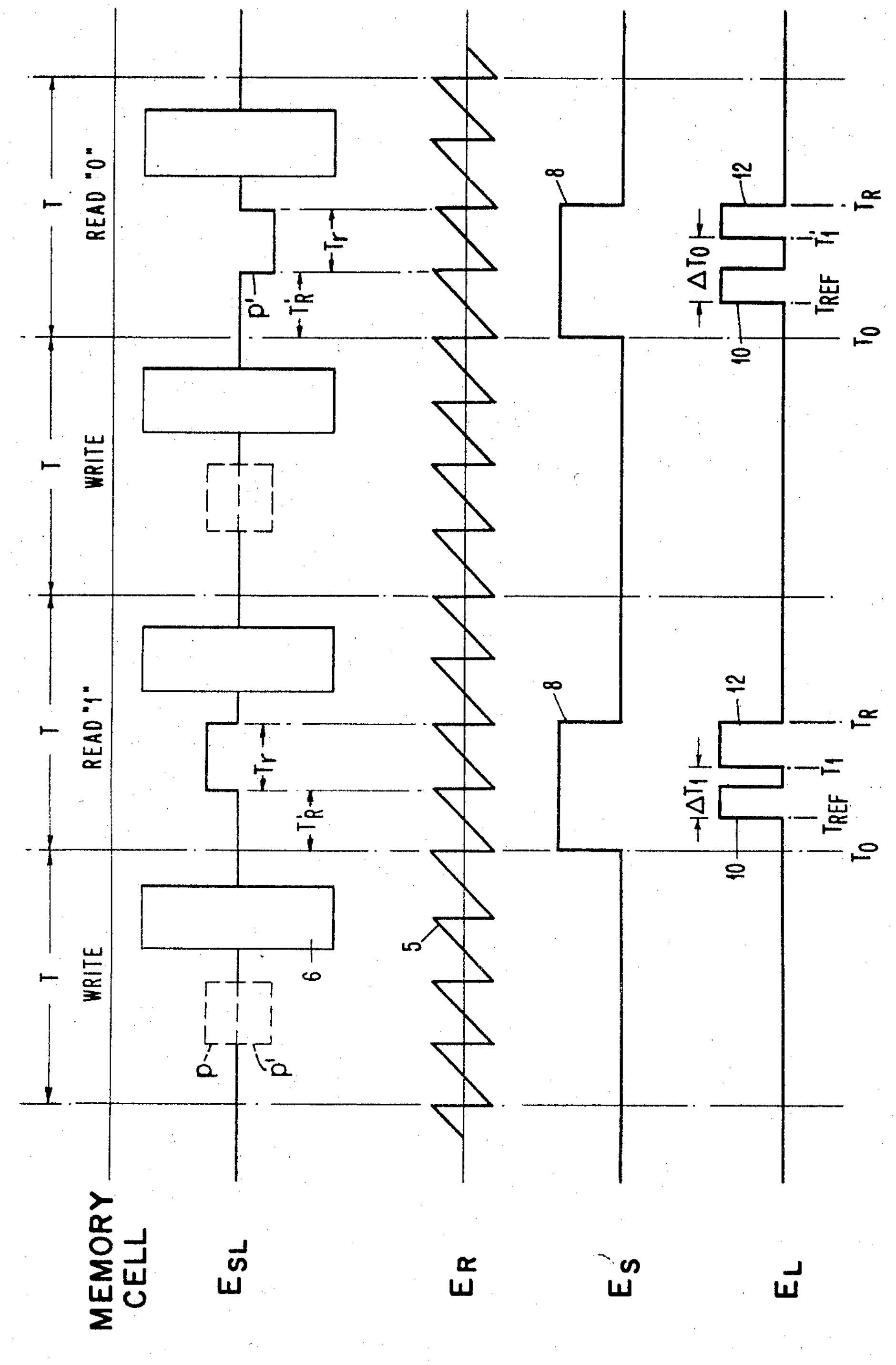
FIGURE 3 is a timing diagram showing two read-write memory cycles of a destructive read memory to aid in an understanding of the operation of the sense amplifier.

The first parallel branch, consisting of $E_B$ and $R_B$, of FIGURE 1*a*, applies a bias to tunnel diodes $TD_1$ and $TD_2$ so that the load line Q, as seen in FIGURE 2, is established. The second parallel branch containing the saw-tooth current source $E_R$, operating through resistor $R_R$, which is constantly applied during the operation of the sense amplifier, modifies the location of the load line Q between Q+ and Q—. The third parallel branch contains a generator $E_S$ of strobe pulses that generates, at the proper time during a read operation, a sampling pulse that shifts the load lines Q—, Q, Q+, respectively, to the positions R—, R, and R+.

During a write cycle that lasts for a period of time T, the operating point R is located somewhere in the region $Z_N$ on the composite characteristic load line of tunnel diodes $TD_1$ and $TD_2$. Since the region $Z_N$ has an upper limit "*a*," said limit being below the switching threshold of the serially connected diodes $TD_1$ and $TD_2$, the latter do not switch during such "write" operation. Since the tunnel diodes have low dynamic resistance, very small or negligible voltages will be produced across the load $R_L$ during such "write" operation.

During a "read" operation, a gating pulse 8 is applied so that the load line of FIGURE 2 is shifted from the region Q+ to Q— to the region R+ to R—, its new operating position as the ramp voltage $E_R$ increases from a negative value to a positive value during the time interval $T_R'$. During period $T_R'$, the tunnel diodes switch first from position *a* to *s* and subsequently switch back to their initial state "*a*" at the end of time interval $T_R'$ when the saw-tooth wave generated by $E_R$ decreases from a positive to a negative voltage. It is noted that the tunnel diodes $TD_1$ and $TD_2$ switch again during period $T_r$ from "*a*" to "*s*" and back again from "*s*" to "*a*" since the gating pulse 8 persists for two saw-tooth cycles. By sensing the time $\Delta T_1$ between the first switch of the tunnel diodes $TD_1$ and $TD_2$ from *a* to *s* starting at $T_{REF}$ time and the second switch of said diodes from *a* to *s* starting at $T_1$ time, one can discriminate between a "1" or a "0" output.

Such difference in switching times can be more readily seen by comparing the time $\Delta T_1$, during a "read" operation between successive switches of the tunnel diodes $TD_1$ and $TD_2$ when there is a positive voltage $E_{SL}$ on sense line 2, representing a "1" in the interrogated storage element, with the time $\Delta T_0$ between successive switches of diodes $TD_1$ and $TD_2$ when there is a negative voltage representative of a "0" storage) on the sense line 2. As can be seen in FIGURE 3, during the sensing of a "1" signal, positive voltage in signal pulse *p* is, during time interval $T_r$, added to the positive going swing of the saw-tooth pulse so that the second switching of tunnel diodes $TD_1$ and $TD_2$ occurs at a time $T_1$ that is sooner than would occur if the positive signal pulse *p* were not present. Whereas, during the reading of a "0" signal represented by the pulse *p'*, the latter serves to delay the effect of the positively increasing voltage of the saw-tooth wave during the interval $T_r$. Thus the interval $\Delta T_0$ between two successive switches of diodes $TD_1$ and $TD_2$ is greater than the interval $\Delta T_1$. It can be seen that variations in the "baseline" of the sense signal on line 2 will cause minor variations in the position of $T_{REF}$, $T_1$ and $T_0$ within the memory cycle, but will not cause variations in the lengths of $\Delta T_1$ and $\Delta T_0$, permitting the sense amplifier, within practical limits, to be independent of such baseline variations.

Figure 1B:
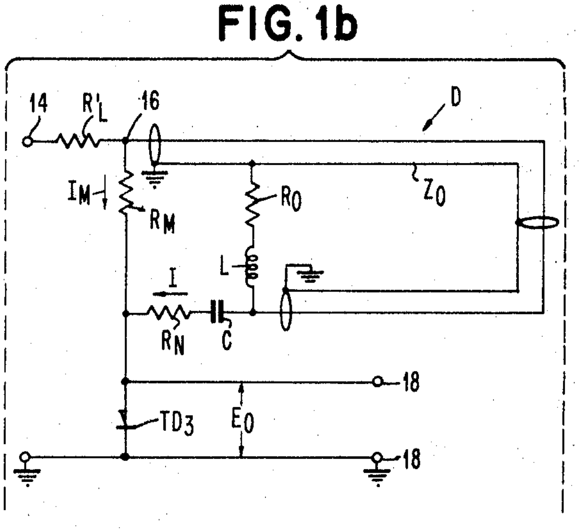

FIGURE 1*b* is a showing of a discriminator circuit, for distinguishing between a "0" signal or a "1" signal on sense line 2, that is compatible with the sense amplifier of FIGURE 1*a*. It is understood that many other discriminator circuits could be employed with the sense amplifiers of FIGURE 1*a*, and the showing of this preferred embodiment of FIGURE 1*b* is not meant to limit the wider use of the sense amplifier of FIGURE 1*a* with many other discriminator circuits.

$R_L'$ in series with the remainder of the circuit of FIGURE 1*b*, for purposes of explaining the invention, replaces the equivalent load $R_L$ that the discriminator circuit presented to the sense amplifier circuit in the previous description. The discriminator circuit includes a delay line D and a network consisting of $R_O$, L, C and $R_N$ that terminate the delay line D in an impedance equal to the characteristic impedance $Z_O$. Capacitor C and resistor $R_N$ serve as a differentiating network. Thus the output pulse appearing on line 3 of the sense amplifier enters the discriminator at terminal 14 and divides at junction 16 to pass through a parallel network, one branch of such parallel network being the resistor $R_M$ and the other branch being the delay network D.

Tunnel diode $TD_3$ receives the pulses from the sense amplifier after they have traversed resistor $R_M$ and delay network D, and the switching of the diode $TD_3$ from one stable state to its other stable state is sensed as voltage $E_O$ at output terminals 18.

Figure 4:
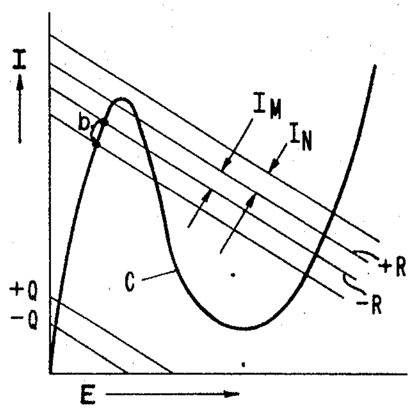
FIGURE 4 is a current-voltage diagram for aiding in an understanding of the operation of the discriminator circuit of FIGURE 1*b*.
Figure 5:
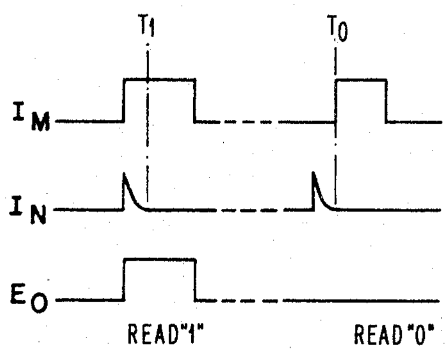
FIGURE 5 is a current-time diagram showing the relative values of a "1" readout and a "0" readout as they appear at the output terminals of the discriminator circuit.

Operation of the discriminator circuit can be better understood by reference to FIGURES 4 and 5 in conjunction with FIGURE 3. FIGURE 4 shows that tunnel diode $TD_3$ is biased by source $E_B$ to lie somewhere in the region *b*, the latter lying in the low voltage region of the characteristic curve C of tunnel diode $TD_3$. The locations of load lines —Q, +Q, —R and +R are a function of saw-tooth generator voltage $E_R$ and strobing voltage source $E_S$ in the same manner as was set forth in FIGURE 2 when describing the operation of tunnel diodes $TD_1$ and $TD_2$.

Assume that a first pulse 10 (FIGURE 3), due to switched diodes $TD_1$ and $TD_2$, enters the discriminator circuit at terminal 14 and travels through resistor $R_M$ and also through delay network D. Neither the current pulse $I_M$ that passes through resistor $R_M$ nor the current pulse $I_N$ that passes through resistor $R_N$ are, by themselves, of sufficient value to switch tunnel diode $TD_3$. However, in the case of a "1" signal, the current pulse $I_N$ and the leading edge of the current pulse $I_M$ are coincident, as shown in FIGURE 5, so that the sum of the current pulses $I_M$ and $I_N$ is sufficient to switch tunnel diode $TD_3$ and produce an output voltage $E_O$ across terminals 18. Such coincidence occurs because the second pulse 12, during a read "1" cycle, begins at $T_1$ time. During a read "0" cycle, pulse 12 begins at $T_1'$ time, so the leading edge of current pulse $I_M$ does not coincide with delayed current pulse $I_N$. As a result, tunnel diode $TD_3$ does not switch, and no output signal is produced across terminals 18. In choosing the parameters for the discriminator circuit so that the proper delay is introduced in the delay line D, $R_O=R_N=Z_O$, the impedance of the delay line D and $L/R_O$ is chosen equal to $R_NC$. In selecting the various resistors, $R_B$, $R_R$ and $R_S$ are chosen to be much greater than $R_{SL}$ and $R_L$ (or $R'_L$).

Thus, the discriminator circuit readily distinguishes between a "0" or a "1" output from the novel sense amplifier of FIGURE 1*a* by being able to discriminate between $\Delta T_1$ and $\Delta T_0$. A discriminator of the type shown, or many others, can be used wherein the principle of pulse-position modulation is employed for sensing signals. Pulse-time modulation takes place when the value of each instantaneous sample of the wave modulates the position, in time, of a pulse. In the present case, "1" signals or "0" signals are sampled by saw-tooth waves 5 and the latter modulate the position, in time, of such "1" and "0" signals. Such modulation, in conjunction with the use of bistable elements similar to tunnel diodes, permits one to obtain a more reliable sensing of information stored in high speed memories.

While the invention has been particularly shown and described with reference to preferred embodiments thereof, it will be understood by those skilled in the art that the various changes in form and details may be made therein without departing from the spirit and scope of the invention.

What is claimed is:

1. An amplifier for amplifying the voltage signal output produced on a sense line associated with a switched bistable storage unit, a pair of tunnel diodes serially connected and biased in their composite low dynamic resistance state, a saw-tooth generator for applying saw-tooth waves to said series connected tunnel diodes for varying the effect of such bias on said diodes, and means for applying a strobing pulse to said diodes, said strobing pulse having a frequency that is less than the frequency of said saw-tooth waves, whereby said diodes switch to their composite high resistance state for each coincidence of strobing pulse and saw-tooth wave, the time between consecutive switching of said diodes during the presence of said output signal on said sense line being different than the time between consecutive switchings of said diodes during the absence of such output signal on said sense line.

2. The amplifier of claim 1 including means for sensing such differences in time between said consecutive switchings.

3. An amplifier for amplifying the voltage signal output produced on a sense line associated with an interrogated bistable storage element, said signal being of a first polarity when the "1" state has existed in said element prior to interrogation and of a zero voltage or opposite polarity voltage when the "0" state has been interrogated, comprising a pair of tunnel diodes serially connected and biased in their first composite stable state, a generator for applying saw-tooth waves to said series connected tunnel diodes for varying the effect of said bias on said diodes, and means for applying a strobing pulse to said diodes, said strobing pulse having a frequency that is less than the frequency of said saw-tooth waves, whereby said diodes switch to their composite high resistance state for each coincidence of strobing pulse and saw-tooth wave, the time between consecutive switchings of said diodes being shorter when the first polarity signal pulse exists on said sense line and longer when said zero or opposite polarity voltage exists on said sense line.

4. An amplifier for amplifying the voltage signal output produced on a sense line associated with an interrogated bistable storage unit, said signal being of a positive polarity when the "1" state has existed in said unit prior to interrogation and of a zero or negative polarity when the "0" state has been interrogated, comprising a pair of tunnel diodes serially connected and biased in their low dynamic resistance state, a saw-tooth generator for applying saw-tooth waves to said series connected tunnel diodes for varying the effect of such bias on said diodes, and means for applying a strobing pulse to said diodes, said strobing pulse having a frequency that is less than the frequency of said saw-tooth waves, whereby said diodes switch to their high resistance state for each coincidence of strobing pulse and saw-tooth wave, the time between consecutive switchings of said diodes being shorter when a "1" signal exists on said sense line than when a "0" signal exists on said sense line.

5. An amplifier for amplifying the voltage signal output produced on a sense line associated with a switched bistable storage element, a pair of tunnel diodes serially connected and biased in their composite low dynamic resistance state, a saw-tooth generator for applying saw-tooth waves to said series connected tunnel diodes for varying the effect of such bias on said diodes, and means for applying a strobing pulse to said diodes, said strobing pulse having a frequency that is less than the frequency of said saw-tooth waves, whereby said diodes switch to their composite high resistance state for each coincidence of strobing pulse and saw-tooth wave, the time between consecutive switchings of said diodes during the presence of said output signal on said sense line being different than the time between consecutive switchings of said diodes during the absence of such output signal on said sense line, means for sensing said difference in switching times comprising two parallel paths for receiving the pulses generated by said switched tunnel diode, and a third tunnel diode in series with said parallel paths and biased to a first stable state, one path directing said generated pulses directly to said third tunnel diodes and its parallel path applying a predetermined delay to said generated pulses, said third tunnel diode switching to its second stable state only when a generated pulse and a delayed pulse appear coincidentally at said third tunnel diode.

References Cited

UNITED STATES PATENTS

| | | | |
|---|---|---|---|
| 3,156,833 | 11/1964 | Cloud et al. | 307—88.5 |
| 3,189,876 | 6/1965 | Pricer et al. | 307—88.5 X |

ARTHUR GAUSS, *Primary Examiner.*

DONALD D. FORRER, *Assistant Examiner.*

U.S. Cl. X.R.

307—228, 238, 269, 286, 322